Feb. 16, 1926.

J. KLIPEC 1,573,553

FISHHOOK

Filed Nov. 6, 1924

Inventor
Joseph Klipec
By Bates, Macklin, Goldrick & Peare
Attorney

Patented Feb. 16, 1926.

1,573,553

UNITED STATES PATENT OFFICE.

JOSEPH KLIPEC, OF CLEVELAND, OHIO.

FISHHOOK.

Application filed November 6, 1924. Serial No. 748,048.

*To all whom it may concern:*

Be it known that I, JOSEPH KLIPEC, a citizen of the United States, residing at Cleveland, in the county of Cuyahoga and State of Ohio, have invented a certain new and useful Improvement in a Fishhook, of which the following is a full, clear, and exact description, reference being had to the accompanying drawings.

This invention pertains particularly to what are known as "weedless" hooks. One form of weed guard heretofore used on fish hooks has embodied a wire loop, which is fastened to the shank of the hook and is arranged to engage the point of the hook. Usually these loops are rigidly attached to the shank of the hook wherefore the resiliency in the material of which the loop is made, comprises the sole means for holding the guard in engagement with the hook.

One of the objects of my invention is the provision of a guard which may be readily removed from the hook to permit the use thereof without the guard, if desired. In this connection, my invention contemplates an arrangement wherein the guard may be normally held in closed position without placing a severe strain on the material of which the guard is formed.

I carry out the above objects by employing a guard in the shape of a loop, the intermediate portion of which is arranged to engage the point of a hook and the ends of which are pivotally mounted within a bracket which is rigidly attached to the shank of the hook. The bracket is so constructed that the arms of the loop engage a cam surface which functions to hold the loop normally in engagement with the point of the hook.

Figure 1:
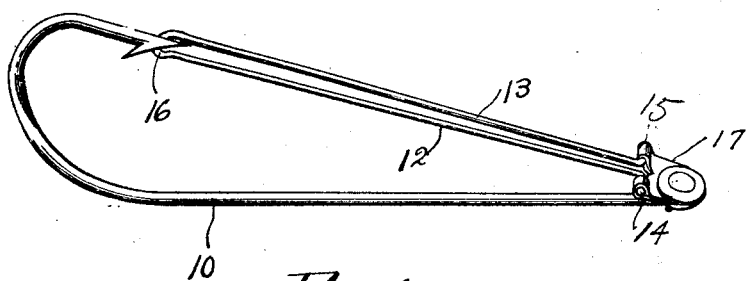
Figure 2:
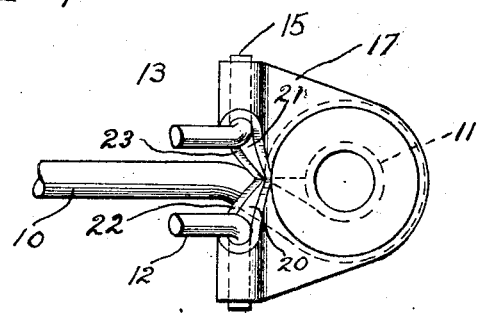
Figure 3:
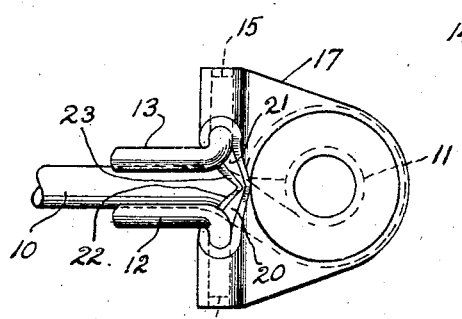
Figure 4:
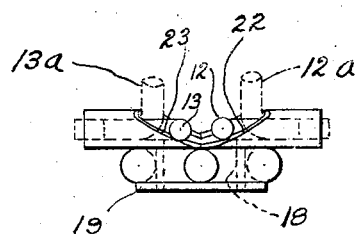

The preferred means for carrying out my invention is illustrated in the drawings, wherein Fig. 1 is a perspective view of a fish hook having a guard embodying my invention; Fig. 2 is a plan view on an enlarged scale showing the means for attaching the guard to the shank of the hook and illustrating the guard in closed position; Fig. 3 is a plan view similar to that shown in Fig. 2 and illustrating the guard in open position and Fig. 4 is a section taken transversely through the shank of the hook.

I have illustrated my invention in connection with a fish hook indicated at 10 which may have an eye 11 which is formed in the usual manner. The weed guard may be formed in a loop and may have arms 12 and 13 which terminate in laterally extending portions 14 and 15 respectively. The length of the arms is such that the loop 16 is normally adapted to engage the hook near the point thereof as shown in Fig. 1.

To support the weed guard upon the hook, I have shown a bracket 17 which is permanently attached in any convenient manner to the shank of the hook. As shown, however, the bracket comprises a plate which is bent intermediately and is attached to the hook by means of an eyelet 18 which is swaged to the bracket and eye respectively. The intermediate portion of the bracket is illustrated as having openings 20 and 21 into which the guard ends 14 and 15, respectively extend. The openings are sufficiently large to permit the ends to be moved freely therein, wherefore the guard may be pivotally mounted within the bracket and may be detached therefrom whenever desired.

To hold the guard in engagement with the point of the hook, I have shown the bracket as having the forward walls of the bracket openings shaped as at 22 and 23, respectively to provide cam surfaces which must be engaged by the arms of the guard whenever such guard is moved inwardly towards the shank of the hook. In Fig. 4, the position of the arms when the guard is closed is shown by the broken lines 12$^a$ and 13$^a$ respectively, while the position of the arms when the guard is open is shown by the full lines. The cam surface therefore necessitates a slight bending of the guard adjacent the pivotal connections, thereby insuring a return to the normal position as soon as the pressure which tends to open the guard is relieved. This result is obtained without requiring the ends of the guard to be clamped within the bracket.

A particular advantage of this construction is the fact that the ends of the guard may be detachably connected to the bracket, thereby permitting the use of the hook independently of the guard. A further advantage of my invention is the simplicity in construction and durability of the guard.

Having thus described my invention, I claim:

1. In combination a fish hook, a weed guard carried thereby, and a cam surface associated with the hook for normally urging the guard into engagement with the hook.

2. In combination a fish hook, a weed guard pivotally mounted thereon, and a stationary cam associated with the hook for deflecting the guard when it is moved in one direction with reference to the hook.

3. The combination with a fish hook, of a weed guard comprising a wire doubled upon itself to comprise a loop adapted to bear against the inner side of the hook point, and having the two ends pivotally mounted on the hook shank and a pair of cam surfaces acting on the two legs of the loop for giving the loop an outward spring pressure.

4. In combination a fish hook, a weed guard pivotally mounted thereon and a member mounted on the hook and having a cam surface cooperating with the guard for normally holding the guard in closed position.

5. In combination a fish hook, a bracket rigidly mounted thereon and a weed guard comprising a wire loop having its ends detachably mounted within the bracket, the bracket having a cam surface coacting with the loop to press it outwardly.

6. In combination, a fish hook, a member carried thereby, the member having spaced openings therein and having a cam surface associated with each opening, and a weed guard having portions entering the opening, said cam surfaces being arranged to engage the guard for holding it in engagement with the hook.

7. In combination, a fish hook, a bracket having an opening extending transversely through the shank of the hook, a weed guard having laterally extending portions projecting into the opening, and means associated with the member for holding the guard normally in closed position.

8. In combination, a fish hook, a bracket rigidly mounted thereon and having aligned openings therein, a U-shaped weed guard having the ends thereof extending within the respective openings, and having the intermediate portion arranged to engage the hook adjacent the point thereof, and a cam associated with the bracket for holding the guard in engagement with the hook.

9. The combination with a fish hook, of a bracket secured thereto consisting of a sheet of material folded on itself and intermediately cut out at the doubled portion to provide two aligned tubular recesses and a guard consisting of a wire loop having two legs with outwardly turned ends, said legs entering the cut out space of the bracket and said ends occupying said tubular recesses.

In testimony whereof, I hereunto affix my signature.

JOSEPH KLIPEC.